United States Patent [19]

Heintzman

[11] Patent Number: 5,419,402
[45] Date of Patent: May 30, 1995

[54] ROTARY HOE

[76] Inventor: Rick Heintzman, R.R. 2, Box 265, Onaka, S. Dak. 57466

[21] Appl. No.: 72,920

[22] Filed: Jun. 7, 1993

[51] Int. Cl.⁶ ...................... A01B 61/04; A01B 71/08
[52] U.S. Cl. ..................................... 172/551; 172/520; 172/540; 172/547; 172/573; 172/606; 172/624; 172/643
[58] Field of Search ............... 172/547, 546, 540, 609, 172/607, 606, 573, 572, 551, 627, 643, 520, 569, 624

[56] References Cited

U.S. PATENT DOCUMENTS

| | | | |
|---|---|---|---|
| 307,809 | 11/1884 | Skillings | 172/547 |
| 321,906 | 7/1885 | McCormick | 172/547 X |
| 617,070 | 1/1899 | Anderson | 172/547 |
| 989,338 | 4/1911 | Corne | 172/547 |
| 3,608,646 | 9/1971 | Ryan | 172/500 |
| 3,734,201 | 5/1973 | Zaun | 172/551 |
| 4,095,808 | 6/1978 | Glasson | 277/81 |
| 4,100,971 | 7/1978 | Honnold | 172/547 |
| 4,103,906 | 8/1978 | Gits | 277/88 |
| 4,194,575 | 3/1980 | Whalen | |
| 4,241,793 | 12/1980 | Watkins | 172/551 |
| 4,398,608 | 8/1983 | Boetto | 172/551 |
| 4,415,041 | 11/1983 | Fackler | 172/551 |
| 4,425,972 | 1/1984 | Steinberg | 172/551 |
| 4,646,850 | 3/1987 | Brown et al. | 172/551 |
| 4,732,398 | 3/1988 | Biss | 277/212 |
| 4,760,806 | 8/1988 | Bigbee et al. | 111/167 |
| 5,020,604 | 6/1991 | Peck | 172/551 X |

Primary Examiner—Dennis L. Taylor
Assistant Examiner—Christopher J. Novosad
Attorney, Agent, or Firm—Westman, Champlin & Kelly

[57] ABSTRACT

A no-till rotary hoe includes trash cutters for cutting field trash carried by the earthworking implements. The rotary hoe also has a walking beam mounted on a support arm with rotary hoe wheels mounted on forward and rear ends of the walking beam. The walking beam is connected to the arm about a pivot positioned to reduce the tendency of the walking beam to pivot excessively in use. A spring is used to aid in maintaining the walking beam properly oriented.

20 Claims, 6 Drawing Sheets

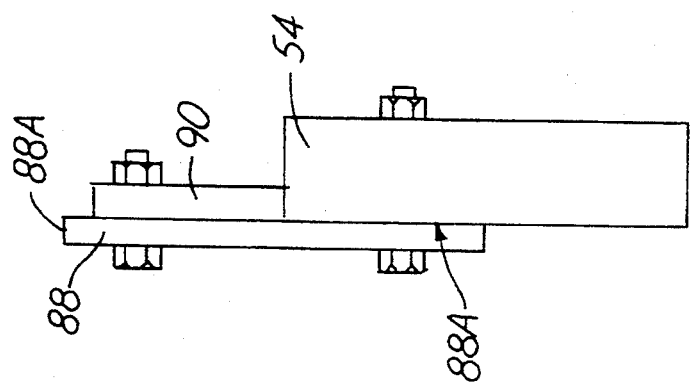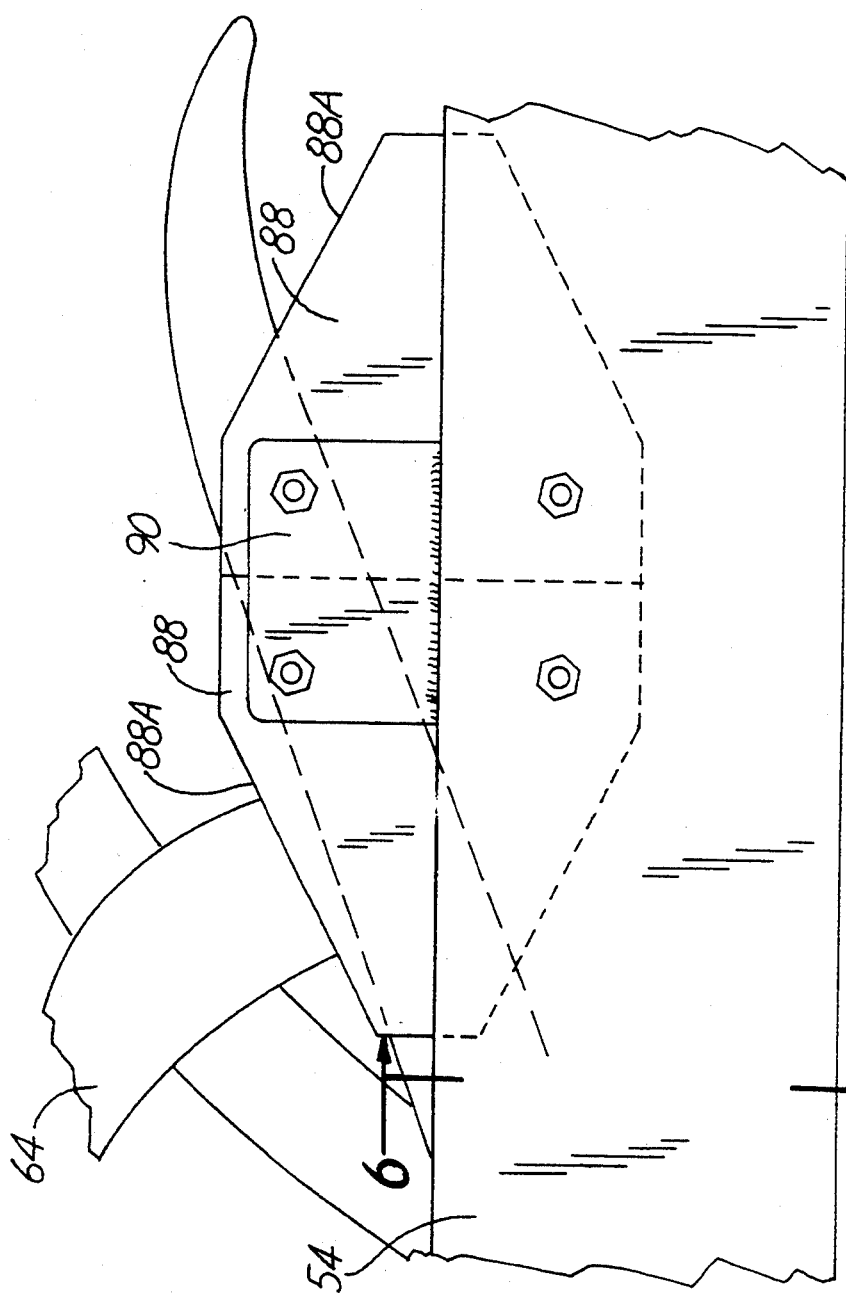

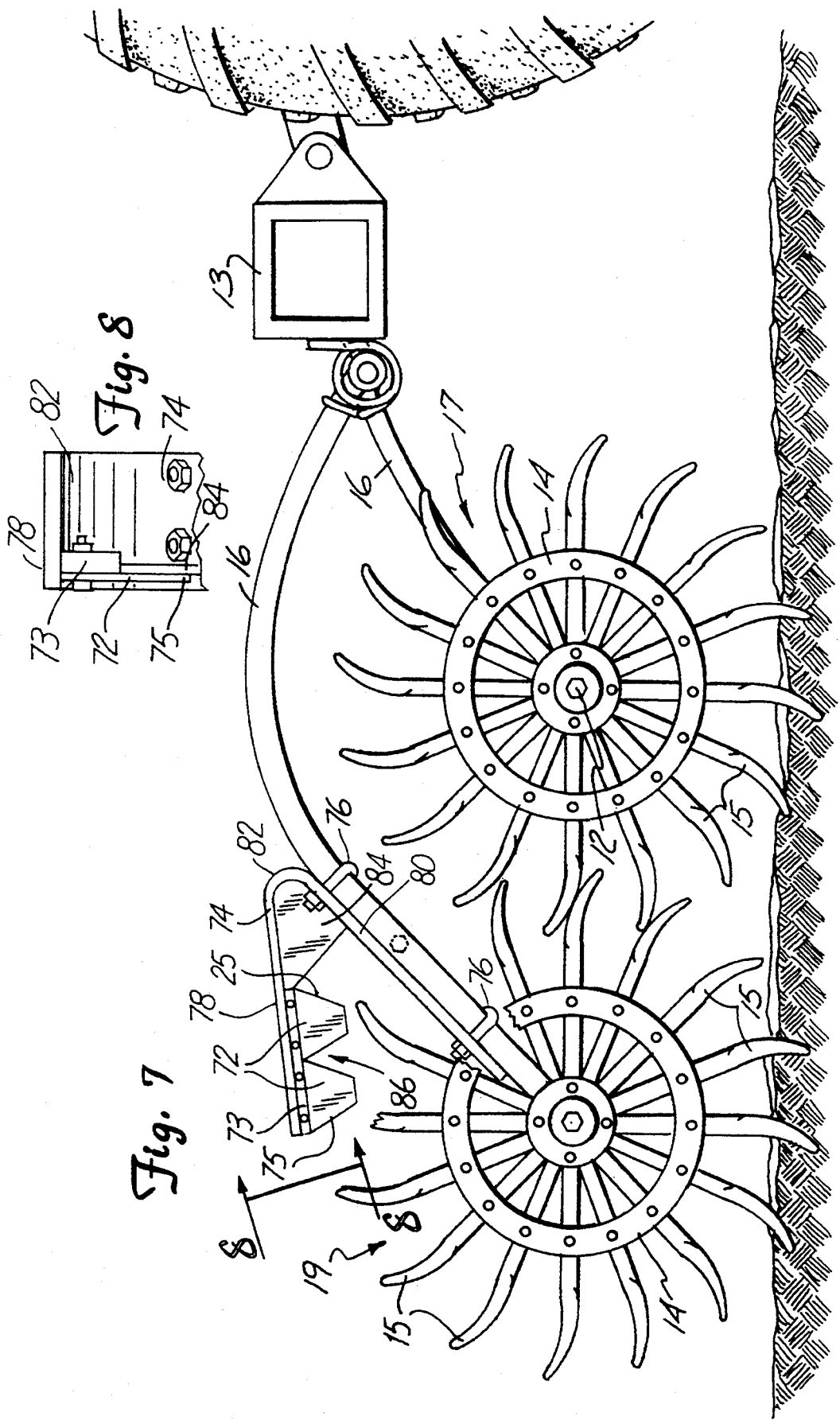

ROTARY HOE

CROSS REFERENCE TO RELATED APPLICATION

Reference is made to my application Ser. No. 07/920,241, filed Jul. 28, 1992, now U.S. Pat. No. 5,224,553, and entitled BEARING PROTECTOR FOR A ROTARY HOE.

BACKGROUND OF THE INVENTION

The present invention relates to an improvement to rotary hoes and, more particularly, to a cutter for cutting trash and crop residue that gets carried around a wheel of a no-till rotary hoe to aid in cleaning such trash from the rotary hoe.

Earth working implements such as rotary hoes used to break up the soil crust close to young plants or to cultivate the fields after plowing have been used for many years. Today, as more farmers utilize chisel plowing rather than moldboard plowing, grass, plant roots, barbed wire, twine, and other trash materials remain on the ground surface. Subsequently, when the ground is cultivated with rotary hoes, the surface trash not turned under during chisel plowing is picked up by the rotary hoes and potentially wrapped around the hoe wheel axle.

When trash is carried around the hoe wheel axle, it is often wedged causing the wheel to stop rotating.

To reduce trash buildup on rotary hoes, it has been common practice to position frame-mounted stripper fingers near the rotary tine path so the trash can be stripped from the rotating tine members. The problem with stripper fingers is that they do not minimize trash buildup on hoe wheel axles. A method to remove trash lodged in the tines of the hoe wheels is disclosed in U.S. Pat. No. 4,100,971, but that structure does not protect the hoe wheel axle either.

Farmers can greatly reduce the use of herbicides and in some cases eliminate them totally with the use of a rotary hoe. When herbicides are needed, they can be used in conjunction with the rotary hoe which will help the herbicide penetrate the soil and get to the roots of the weeds faster and directly thus allowing a greatly reduced amount of herbicide to be used. But farmers will not begin to use rotary hoes until the hoes can be cost effective for them to use. The cutter aids in removing trash to reduce down time and the effects of stuck or jammed hoe wheels in causing unwanted furrows.

SUMMARY OF THE INVENTION

The improvement of the present invention permit more effectively cutting trash on a rotary hoe, regardless of the support arm configuration. In one form, a walking beam support is used to mount hoe wheels at the front and rear of the beam. The walking beam is pivotally mounted to a support arm at a point closer to the front end of the walking beam than the rear. A spring is connected to the front end of the walking beam to prevent the front hoe wheel from digging too deep. The rear hoe wheel is urged to dig deeper.

The trash cutter may comprise a single blade or a plurality of blades mounted together on a mounting bar. The mounting bar is adapted to fit either straight support arms or curved support arms. The blades preferably comprise sickle sections mounted onto the mounting bar so as to form a sawtoothed configuration to improve cutting and to prevent trash from being propelled toward the tractor towing the hoe or from wrapping around the axle.

BRIEF DESCRIPTION OF THE DRAWINGS

FIG. 5 is an enlarged side view of the cutter assembly used in the rotary hoe system of FIG. 4;

FIG. 6 is a sectional view taken as on line 6—6 in FIG. 5.

FIG. 7 is a side elevational view of a modified cutter of the present invention installed on a rotary hoe; and FIG. 8 is a view taken along line 8—8 of FIG. 7.

DETAILED DESCRIPTION OF THE PREFERRED EMBODIMENTS

Rotary hoes are typically used attached to a tractor-type towing vehicle by means of a hitch mechanism as shown and described in more detail in U.S. Pat. No. 4,194,575. Earth working implements such as rotary hoes have been used to break up the soil crust close to young plants or to cultivate the fields after plowing have been known for many years. Today, as more farmers utilize chisel plowing rather than moldboard plowing, grass, plant roots, barbed wire, twine, and other trash materials remain on the ground surface. Subsequently, when the ground is cultivated with rotary hoes, the surface trash not turned under during chisel plowing is picked up by the rotary hoes and tends to wrap around the hoe wheel axle.

Figure 1:
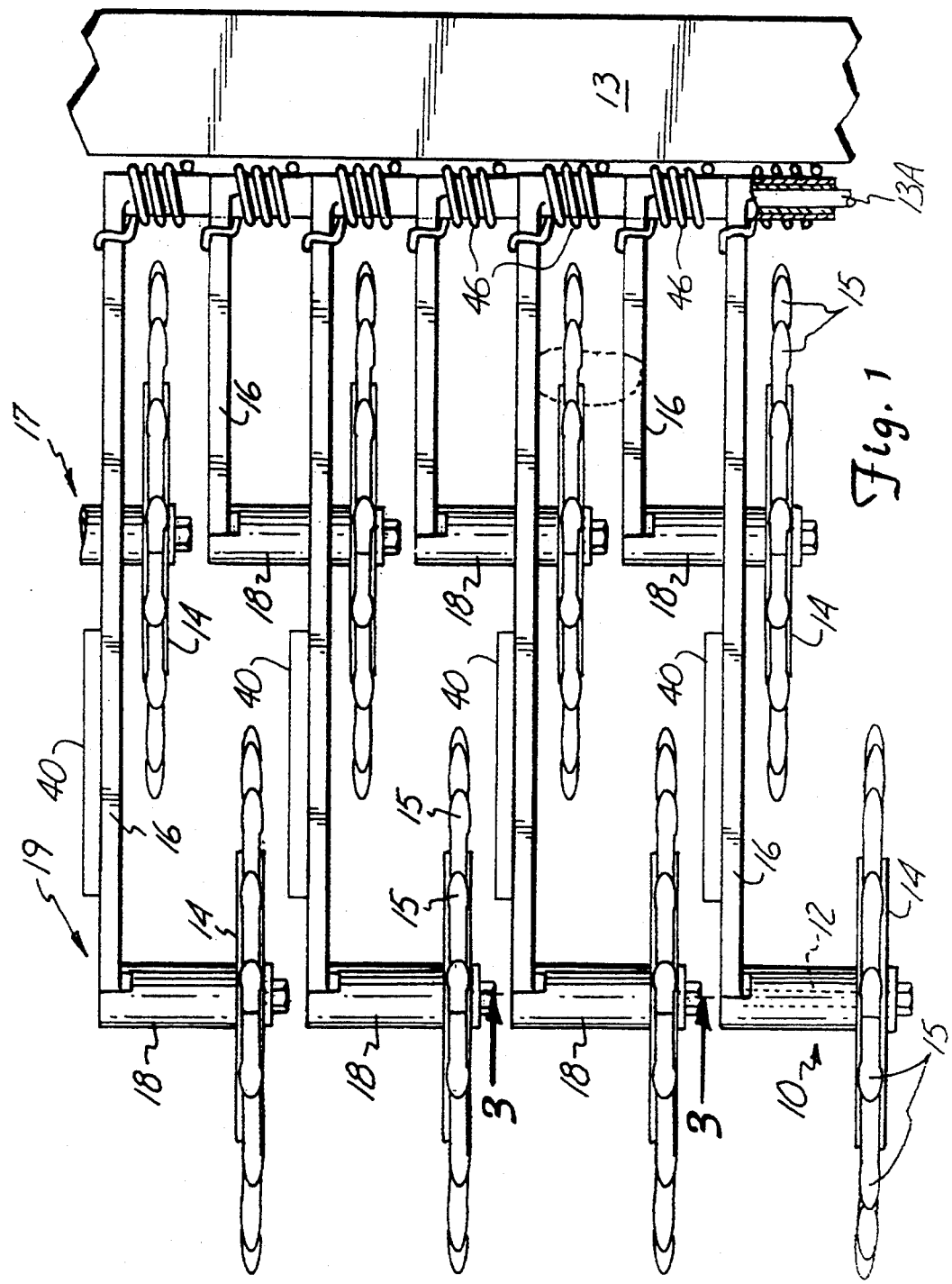
FIG. 1 is a top plan view of a two row rotary hoe system having a bearing protector kit installed and having a cutting apparatus of the present invention attached.

A no-till rotary hoe is indicated generally at 10 in FIG. 1. Hoe wheels 14 are arranged in two rows, having a front row 17 in advance of a back row 19 as described in detail in U.S. Pat. No. 4,194,575 assigned to Yetter Manufacturing Company. The hoe wheels 14 are each attached to an independent support arm 16 which may attach to a tool bar 13 in a commonly known manner through a support rod 13A supported on tool bar 13. A torsional spring 46 is attached to the arms 16 to apply a downward force on each support arm 16.

An elongated axle 12 which mounts hoe wheels 14 spaced laterally away from their corresponding support arms 16 and in close proximity to the adjacent support arm. This is done to eliminate or greatly reduce the weed, crop residue, and trash buildup from getting packed between the hoe wheel 14 and its corresponding support arm 16. The other reason for moving the wheel 14 away from the corresponding support arm 16 and into close proximity with the adjacent support arm is to provide for a self-cleaning function.

Figure 3:
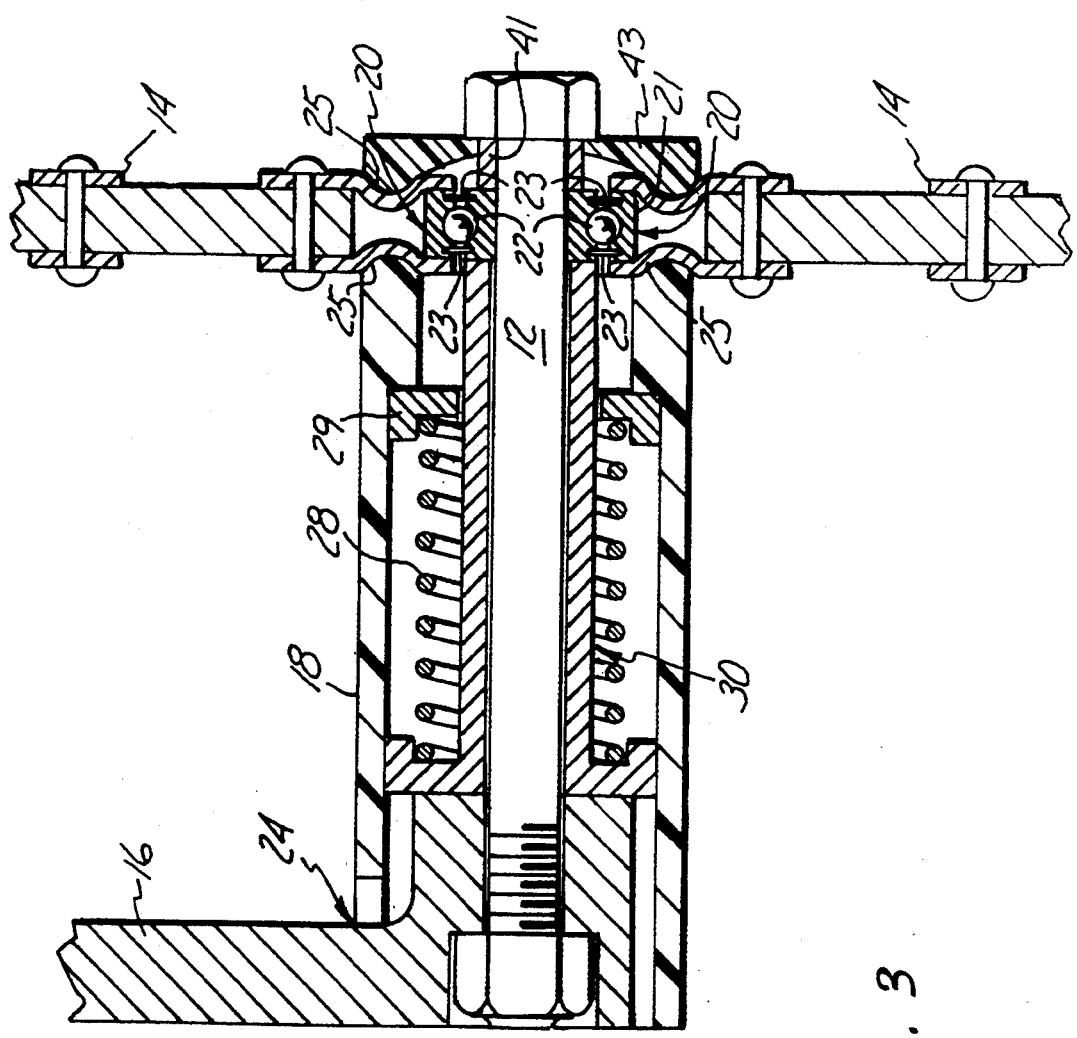
FIG. 3 is an enlarged sectional view taken along line 3—3 of FIG. 1.

The improvement also comprises providing a spring-loaded protective sleeve 18 which covers the elongated axle 12 as illustrated in FIG. 3. The sleeve 18 is spring loaded to maintain a positive, compression loaded frictional seal with a bearing or bushing 20 of each hoe wheel 14. A slot 24 in the sleeve fits over the arm 16 to prevent the sleeve 18 from rotating. The frictional seal is important to prevent twine, barbed wire, or other trash from wedging between the support arm 16 and bearing 20 causing increased stress and strain or uneven wear on bearing seals 23 thus wearing out the bearing seals 23. The frictional seal also provides a water and dust resistant barrier which helps prolong the wear life of the bearings 20 supporting the hoe wheels 14.

The elongated axle 12 is utilized to move the hoe wheels 14 away from their corresponding support arms 16. The axle 12 of the present invention is a six inch long bolt which moves the hoe wheel 14 approximately five and one quarter inches away from its corresponding support arm 16. Moving the hoe wheel 14 this far from its corresponding support arm 16 places it in close proximity to an adjacent support arm. The sealed ball bearing 20, as illustrated in FIG. 3, with the bearing seals 23 which is between an outer race 21 clamped on the rotary hoe wheel 14 and an inner race 22 held on the elongated axle 12 is used to support each hoe wheel 14. The axle 12 passes through a spacer 30 that spaces the hoe wheel 14 out from the arm 16.

To protect the elongated axle 12 and to protect the bearing 20 from becoming dusty and dirty and causing premature bearing failure because of damaged seals, protective sleeve 18 is provided to encompass the axle 12. The sleeve 18 is spring loaded with a spring 28 acting between a shoulder in sleeve 18 and the arm 16 through washers 29 and 34 to maintain a compression frictional seal with outer flanges 25 of bearing 20 used for mounting the outer races 21 to the hoe wheel 14. The sleeve 18 abuts inner flanges 25 radially outside the bearing seals 23 and the axle is a bolt bearing on the inner race through a spacer 41 to clamp the bearing against spacer 30 and, thus, against a hub on arm 16. A low friction cap 43 is held to sealingly ride on the outside flanges 25.

In operation, with the elongated axle 12 installed and the protective sleeve 18 installed, the invention provides protection for the axle 12 and the bearing 20, and also creates a self-cleaning operation. When being pulled through a field, the hoe wheels 14 rotate causing a succession of tines 15 to penetrate the field surface. As the rotary hoe 10 moves across the field, twine and barbed wire may be wrapped around the protective sleeve 18. Because the protective sleeve 18 is not rotating, is of fairly large diameter as compared to the axle 12, is spring loaded, and forms a frictional seal with the bearing 20, the barbed wire or twine does not affect the bearing 20 operation at all. It can wrap around the protective sleeve 18 but causes no problems for the bearing seal 23. If the twine or barbed wire does wrap around the sleeve 18, it is easy to cut away and remove.

Figure 2:
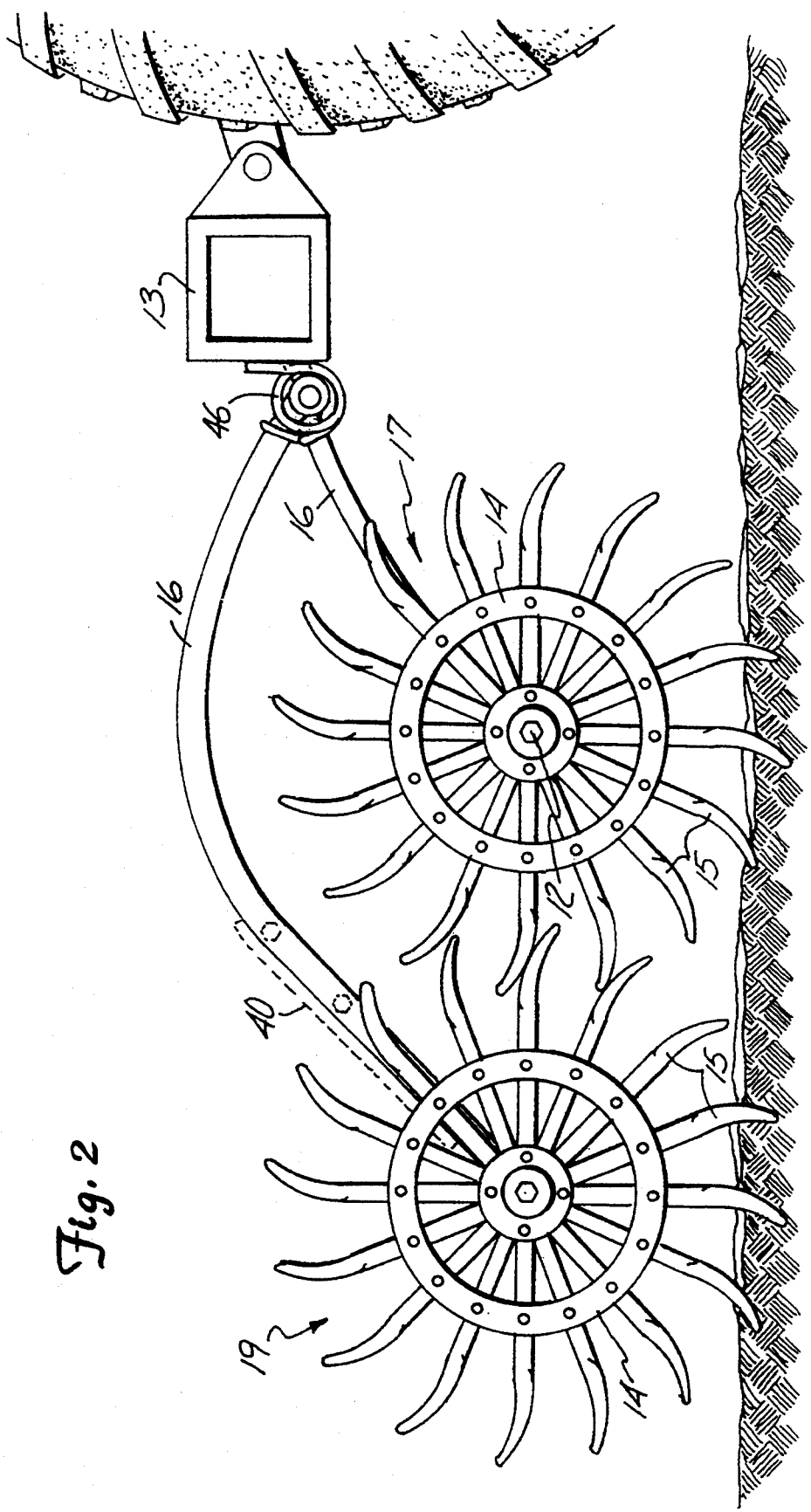
FIG. 2 is a side elevational view of a two row rotary hoe system having a cutter of a first form of the present invention attached.

In FIG. 2, a resharpenable knife 40 is shown mounted to or adjacent the back edges of the back row 19 of support arms 16. The knife 40, which is also illustrated in FIG. 1, is mounted to be approximately ¾ of an inch from its nearest hoe wheel 14. When trash such as corn or sunflower residue begins to bind in the tines 15, the trash is carried by the hoe wheel 14 around its path of travel up past the nearest support arm 16 where the knife 40 will cut the trash. The knife 40 is mounted on the side of arm 16 with counter sunk bolts or capscrews (not shown) to prevent trash from catching on the bolts.

Figure 4:
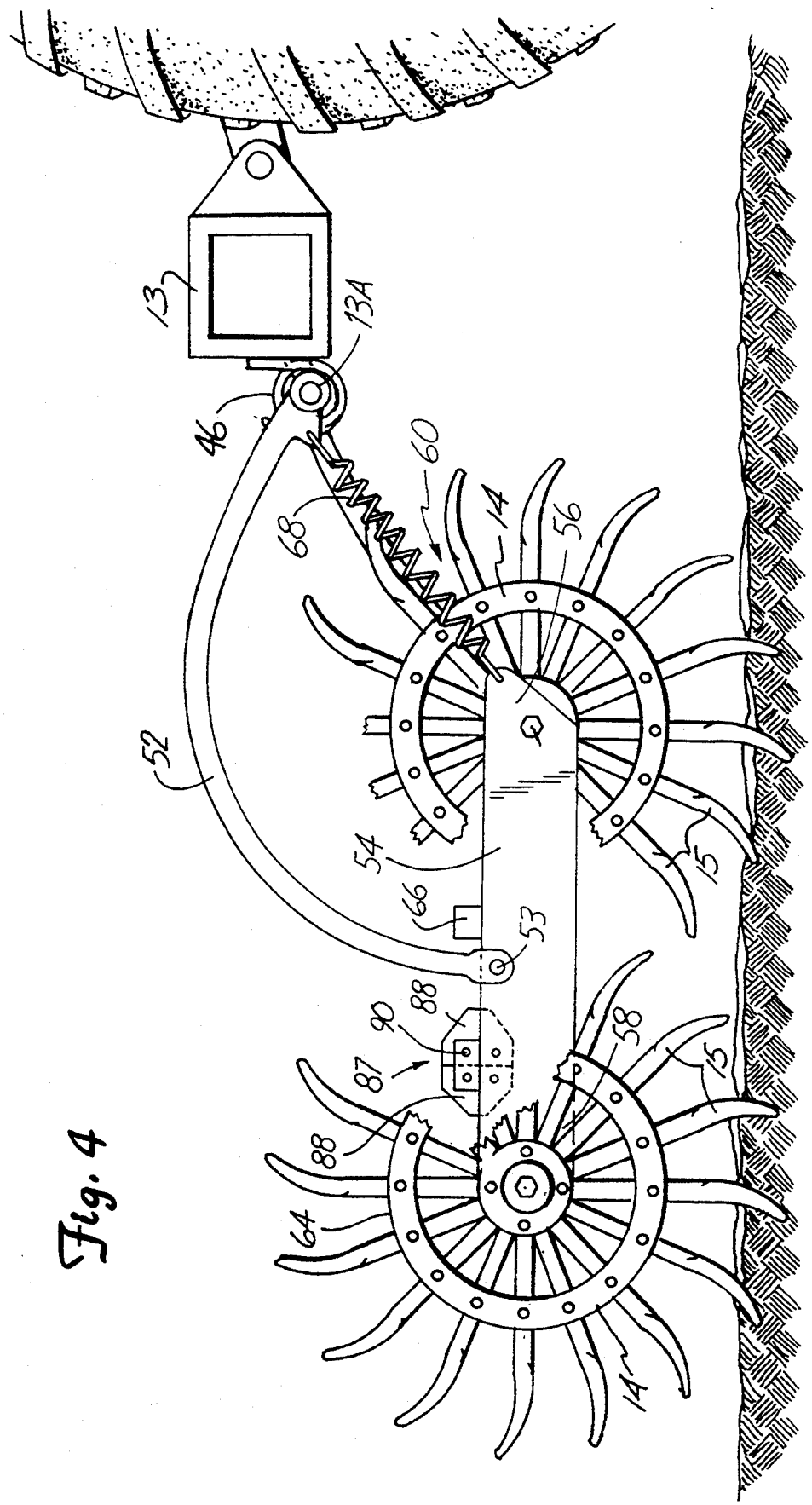
FIG. 4 is a side elevational view of a rotary hoe system utilizing a walking arm for mounting hoe wheels.

The improvements of the present invention were designed so that the bearing protectors will also effectively work on a system that has two hoe wheels mounted to a walking beam on each support arm and to more effectively cut trash in both a two support arm system and a single support arm system. As illustrated in FIG. 4, a single support arm 52 is mounted to the tool bar 13 through support rod 13A. Torsional spring 46 is connected to both the support rod 13A and the support arm 52 as illustrated in FIG. 4, to provide a downward force to the support arm. A walking beam 54 is pivotally mounted to the single support arm 52 in a commonly known manner at a pivot point 53. The walking beam is preferably 5/16 of an inch thick steel, 3 inches wide and is approximately 22 inches long. The walking beam 54 has a front end 56 and a rear end 58. Pivot point 53 is slightly ahead of the midpoint between the hoe wheels 50 and 64 supported on the walking beam, and as shown approximately 8 inches from the front end 56 of the walking beam 54 and approximately 11 inches from the rear end 58. A front hoe wheel 60 is rotatably mounted to the front end of walking beam 54, preferably using the bearing protector kit 10. A rear hoe wheel 64 is mounted to the rear end 58 of the walking beam in a similar fashion but to the opposite side of the walking beam 54.

A limit stop block 66 is welded to the top portion of the walking beam 54 as illustrated in FIG. 4, just ahead of and in position to engage support arm 52 when the walking beam pivots counterclockwise a preselected amount. The limit stop block 66 prevents the rear hoe wheels 64 from dragging when the tool bar 13 lifts the rotary hoe assembly out of the ground for turning or transport purposes. Without the limit stop 66, when the implement is lifted out of the ground, the rear end 58 of the walking beam 54 will tend to fall toward the ground. The limit stop block 66 prevents the rear end 58 from falling to the ground by abutting the single support arm 52.

A maintaining tension spring 68 is provided to keep the walking beam 54 substantially parallel to the ground in use. The front hoe wheel 60 is kept from burrowing too deep into the earth, and pressure is applied onto the rear hoe wheel 64 which encourages the rear hoe wheels to dig deeper into the earth. Maintaining spring 68 is in addition to the existing torsional spring 46 that applies a downward force on all of the support arms. Spring 68 is preferably connected at the bottom end to walking beam 54 and at its top to a bracket that moves with the support arm 52 so, as the arm 52 pivots, the tension in maintaining spring 68 does not change because of the movement of arm 52. The maintaining spring 68 used in the preferred embodiment is sufficient to prevent the walking beam from "tumbling" in clockwise direction under load. If the front hoe wheel 60 goes down, the walking beams can essentially flip over about pivot 53. If that occurs, the hoe assembly had to be stopped and raised, and then the walking beam could be reset.

In prior walking beams, such as shown in U.S. Pat. No. 3,734,201, the pivot point is closer to the rear hoe wheel than it is to the front hoe wheel. A problem encountered with designs that have the walking beam pivot point nearer the rear wheel is that the front wheel may be locked up in the air if a rock or mound is struck because the front wheel has a tendency to bounce up and out of the earth. This causes the rear hoe wheel to dig deeper into the earth. With the added force from the torsional spring on arm 52, the rear hoe wheel may be encouraged to go over center, thus effectively locking the front hoe wheel out of the ground until the operator stops the tractor and manually removes the rear hoe wheel from the ground.

The present invention alleviates this problem by placing the pivot point 53 closer to the front hoe wheel 60 and providing the maintaining spring 68 to control the front hoe wheel 60. For example, when the tractor is traveling in a forward motion, as illustrated in FIG. 4, the hoe wheels 60, 64 are rotating in a clockwise direction. The interaction between the hoe wheels and the earth will cause the walking arm 54 to have a clockwise rotation which is 10 also illustrated in FIG. 4. This clockwise rotation tends to pull the rear hoe wheels 64 up out of the ground. The maintaining spring 68 prevents this from happening by pulling up on the front hoe wheels 60 and substantially leveling the walking arm 54.

Also, as stated, the spring 68 tends to prevent the walking beam from tumbling and locking.

Another improvement to the walking beam 54 is that it is long enough to work with the bearing protector system of FIG. 2. In order for the rotary hoe system having my bearing protector 10 to work with hoe wheels mounted to support arms from other manufacturers, the walking beam had to be lengthened. If the walking beam 54 was not lengthened the hoe wheels 60, 64 mounted onto the walking beam 54 would not be in line with the hoe wheels mounted on other types of support arms.

A trash cutter 87 is mounted on the walking beam 54 and illustrated in FIGS. 4 and 6. In this embodiment, a pair of cutting blades 88 formed of sickle knife sections are mounted to the walking beam 54 as illustrated in FIGS. 1, 4, and 5. A mounting bracket or plate 90 is welded to the top of walking beam 54 and the blades 88 are bolted to the plate and to the walking beam 54 itself. The sickle knife sections have beveled, sharpened edges 88A that are serrated to enhance cutting. The two sickle sections are placed with the tops abutting and the narrow ends facing in opposite directions, so one edge of each section faces upwardly. With the bolting arrangement, the two sections can be inverted so the inward edges face upwardly for cutting when the first set of edges get dull. The blades are placed on the side of the walking beam nearest an adjacent hoe wheel. The mounting plate 90 has holes 92 for receiving bolts or and the walking beam 54 is also provided with holes 93 to mount the blades 88 as illustrated. The blades are positioned to the rear of the pivot point 53, and are mounted with the flat side facing out toward an adjacent hoe wheel, and the bevels forming the sharpened edges facing in toward the walking arm 54.

Mounted as shown, the blades form substantially inclined cutting edges 88A, which effectively cut trash and residue and also prevents trash from being propelled toward the tractor. When cutting edges become dull, it is very simple to remove the bolts or other fastening means holding the blades 88 in place and to reverse the blades.

A further embodiment of 40 in the present invention is a trash cutter 70 shown in FIGS. 7 and 8 mounted on the rear portion 58 of the walking arm 54. The cutter of FIG. 1 was not easily adapted to fit on both straight support arms and curved support arms. Crop residue is difficult to cut, and the cutter 70 is a more aggressive cutting system. The cutter 70 is also adaptable to both curved and straight support arms and does not propel cut crop residue forward toward the tool bar 13, while at the same time cutting a high percentage of the trash and residue.

The cutter 70 of the present invention, as illustrated in FIG. 7, preferably comprises a pair of sickle knife sections 72 bolted adjacent to each other on a mounting bar or bracket 74, which is folded into a V shape and is attached to a support arm 16 by u-bolt clamps 76, as illustrated. The mounting bar 74 is bent at end 82 to form approximately a 45 degree angle included between a top leg 78 and a lower leg 80. The leg 78 may be slightly longer than the bottom leg 80. The mounting bar is approximately as wide as the support arm 16, so it bolts securely to the support arm and has adequate strength.

A triangle plate 84 is provided to help support the projecting legs of the mounting bar 74, and to fill in the end of the V shape to reduce the likelihood that residue will become wedged into the bend at end 82. As may be seen in FIG. 7, the leading edge of triangle plate 84 forms a 90 degree angle with the lower leg 80, which allows residue stopped by the triangle plate to fall freely downward.

As previously stated, the blades 72 are cutting edge sickle knife sections. The blades have a beveled sharpened edge 75. The blades 72 are mounted onto the mounting bar 74 using a backing strap 73 that is welded to upper leg 78 and the knife sections or blades are bolted side by side along the backing strap. The blades 72 are mounted as such to present a sharp, effective cutting surface to cut residue carried across the blade by an adjacent hoe wheel.

When mounted onto the upper leg 78 of the mounting bar 74, as shown in FIG. 7, the adjacently mounted blades 72 form a pair of V shaped cutting edges, with a wedge shaped cutout 86 between the blades 72, forming a sawtoothed configuration. When trash, such as corn or sunflower residue, begins to bind in the tines 15 of an adjacent rotary hoe wheel, the trash is carried by the rear hoe wheel around its path of travel up past the nearest support arm where the residue momentarily engages one of the V's formed by the blades 72. The residue is thus sheared by the blades 72, while the sawtoothed configuration prevents the residue from being thrown forward towards the tool bar 13. Also, by mounting the blades in this manner, crop residue or other trash that is carried across the blades will tend to fall freely downward after being cut.

Although the present invention has been described with reference to preferred embodiments, workers skilled in the art will recognize that changes may be made in form and detail without departing from the spirit and scope of the invention.

What is claimed is:

1. An apparatus comprising:
   a plurality of support means adapted for attachment to a tool bar for supporting earth working implements wherein there is at least one earthworking implement mounted on each support means, said implements being arranged into at least one row; and
   a cutter mounted on at least selected ones of the support means adjacent an implement supported on an adjacent support means for cutting trash caught in the implement of the adjacent support means as trash carried by the implement is moved across the cutter.

2. The apparatus as in claim 1 wherein the support means comprises a walking beam and a support arm wherein the walking beam is pivotally mounted to the support arm and the support arm is attached to the tool bar.

3. The apparatus as in claim 2 wherein the earthworking implements are rotatably mounted to the walking beams.

4. The apparatus as in claim 2 wherein the walking beam is pivotally mounted to the support beam at a pivot point closer to a front end of the walking beam than to a rear end of the walking beam.

5. The apparatus as in claim 4 wherein the cutter is mounted to a top portion of the walking beam to the rear of the pivot point of the walking beam to the support arm.

6. The apparatus as in claim 2 wherein the walking beam has a stop attached to its top side for stopping the walking beam from pivoting past a predetermined point.

7. The apparatus as in claim 1 wherein the cutter comprises a plurality of blades having sharpened edges mounted to the support means.

8. The apparatus as in claim 7 wherein the support means comprises a support arm and a plurality of clamps to clamp the cutter onto a support arm.

9. The apparatus as in claim 8 wherein the cutter comprises a mounting bar supporting the blades having a first leg connected to the support arm of at least one row, and having a bend forming a second leg above and facing the support arm that the mounting bar is mounted to, the blades being supported on the second leg and extending toward the first leg.

10. An improvement for rotating earthworking implements carried by a tool bar and arranged into rows having a first row in advance of a second row, support means for rotatably supporting at least one implement for working, an elongated axle between each implement and a corresponding support means, each elongated axle laterally spacing the implements in the first row nearer an adjacent support means for the first row than its corresponding support means for the first row and laterally spacing each implement in the second row nearer an adjacent support means for the second row than its corresponding support means for the second row, the support means comprising a walking beam and a support arm wherein the walking beam is pivotally mounted to an end of the support arm and another end of the support arm is attached to the tool bar.

11. The apparatus as in claim 10 wherein the earthworking implements are extendedly mounted from the walking beams.

12. The improvement as in claim 10 wherein the walking beam is pivotally mounted to the support arm closer to a front end of the walking beam than to a rear end of the walking beam and spring means connected to the walking beam tending to urge the front end of the walking beam upwardly.

13. The improvement as in claim 10 further including a maintaining means connected between a front end of the walking beam and the tool bar for maintaining the walking beam substantially parallel to the ground.

14. The improvement as in claim 10 and stop means attached to the walking beam for stopping the walking beam from pivoting past a predetermined point relative to the support arm in a direction raising a forward end of the walking beam.

15. The improvement as in claim 10 further including a cutter mounted to the support means for engaging and cutting trash carried across the cutting means as the rotating earthworking implements rotate.

16. The improvement as in claim 10 further including cutting means mounted to a rear portion of the walking beam wherein the cutting means comprises a plurality of blades mounted to provide an inclined cutting edge mounted to a bracket for mounting the blades to the support means.

17. An improvement for rotating earthworking implements carried by a tool bar and arranged into rows having a first row in advance of a second row, support means for rotatably supporting a pair of rotary earthworking implements for working soil, wherein the support means comprises a support arm pivotally mounted to the tool bar at one end and a walking beam is pivotally mounted to a second end of the support arm about a pivot, the pivot between the walking beam and the support arm being forwardly of the mid-point between the axes of mounting of the earthworking implements, and means biasing the walking beam relative to the support arm to tend to pivot the forward end of the walking beam upwardly.

18. The improvement of claim 17 and a trash cutter comprising at least one sharpened blade mounted on the top portion of the walking beam for cutting trash carried across the cutter by an earth worker implement.

19. An apparatus comprising a plurality of support arms adapted for attachment to a tool bar, at least one rotating earthworking implement mounted on each support arm, said implements being arranged into at least one row, a sharpened cutting blade mounted on at least selected ones of the support arms adjacent an implement supported on an adjacent support arm for cutting trash caught in an implement as trash carried by the implement is moved across the cutting blade on an adjacent support arm.

20. The apparatus as in claim 19 wherein the cutting blades are upwardly facing blades mounted forwardly of the axis of rotation of the adjacent implement.

* * * * *